April 18, 1950     N. E. WAHLBERG ET AL     2,504,286
THROTTLE CONTROL
Filed June 8, 1946     2 Sheets-Sheet 1
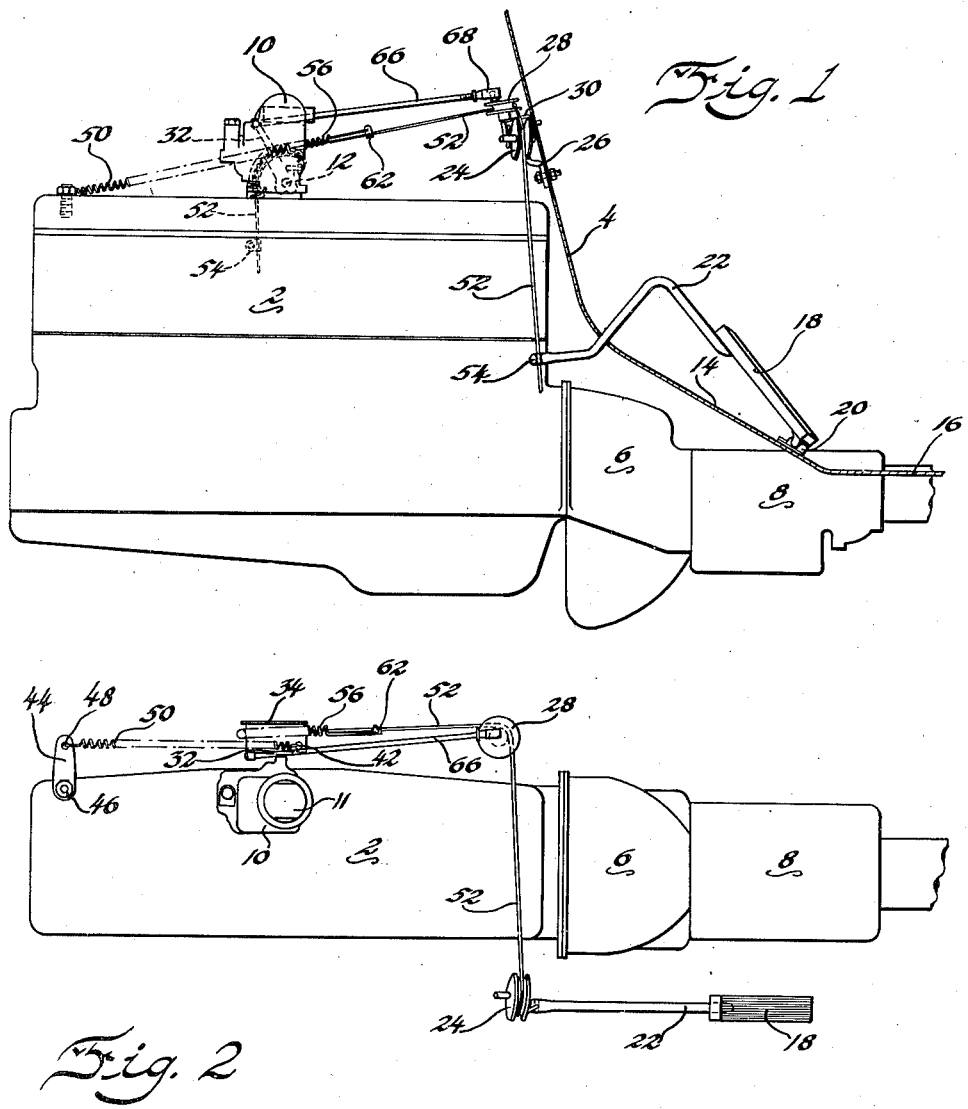
NILS ERIK WAHLBERG
JOSEPH F. SLADKY
INVENTOR.
BY Carl J. Barbee
THEIR ATTORNEY

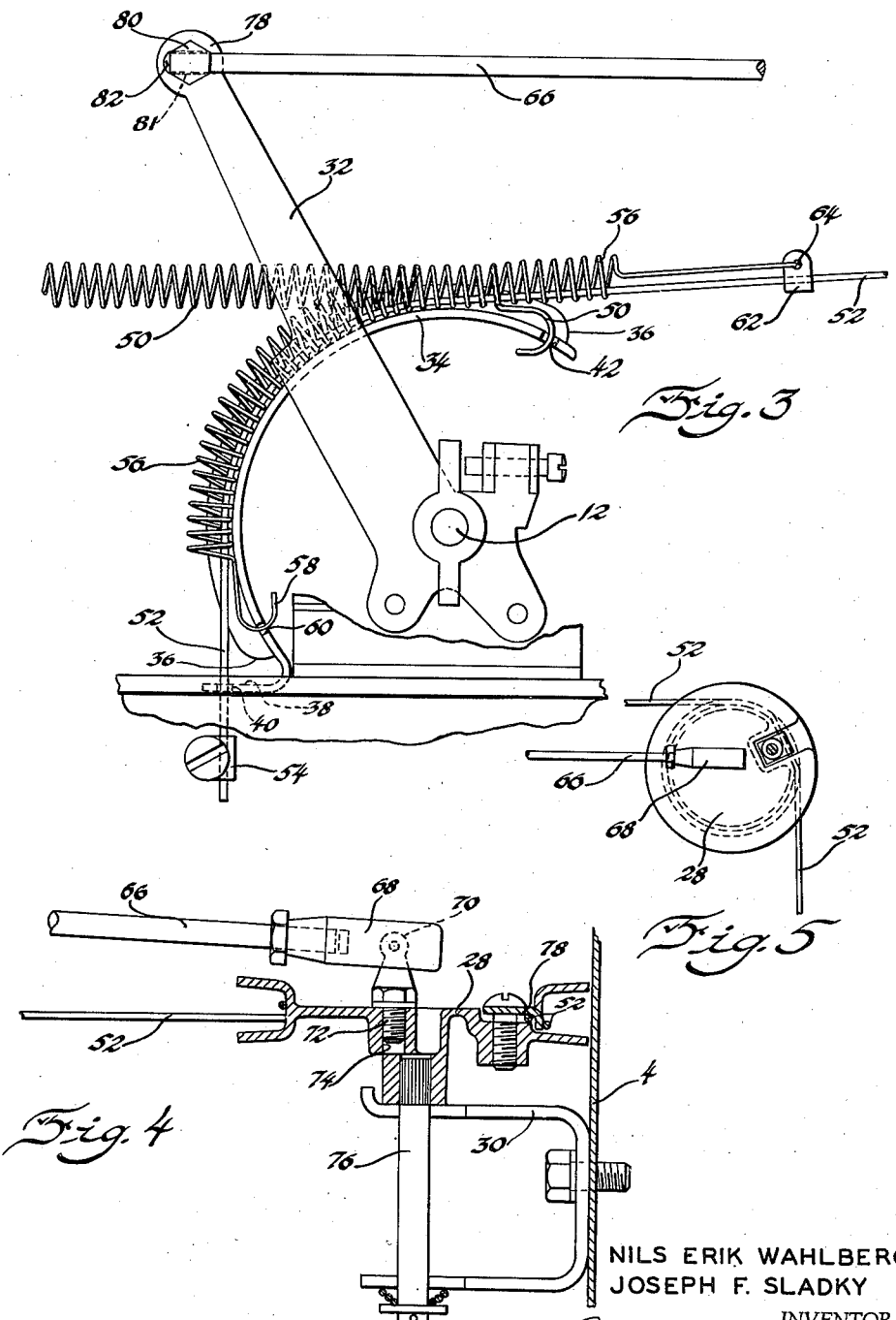

Patented Apr. 18, 1950

2,504,286

UNITED STATES PATENT OFFICE 2,504,286

THROTTLE CONTROL

Nils Erik Wahlberg, Chicago, Ill., and Joseph F. Sladky, Detroit, Mich., assignors to Nash-Kelvinator Corporation, Kenosha, Wis., a corporation of Maryland Application June 8, 1946, Serial No. 675,498

12 Claims. (Cl. 74—513)

This invention relates to control devices and has particular reference to a control device for operating the carburetor for an internal combustion engine.

It is an object of this invention to provide a control mechanism for a carburetor by which the throttle of the carburetor is opened at a varying rate.

It is another object of this invention to provide a control mechanism for the throttle of a carburetor which will accelerate the engine at a varying rate to provide smoother functioning of said engine.

It is a further object of this invention to provide a control mechanism for the throttle of a carburetor which is simple and economical to manufacture and can be installed in an ordinary automobile without important revisions of the parts thereof.

Other objects and advantages of this invention will be apparent from a consideration of the following description and claims and the attached drawings, of which there are two sheets.

In the drawings, in which like reference characters are used to designate similar parts;

Figure 1 is a side elevational view through the motor compartment and dash panel of an automobile;

Figure 2 is a top view of an automobile engine, clutch housing and transmission with the invention shown in relation thereto;

Figure 3 is a side elevational view of a portion of the invention shown in Figures 1 and 2;

Figure 4 is a side elevational view, partially in section, of a portion of the invention shown in Figures 1 and 2; and Figure 5 is an enlarged plan view of a portion of the invention shown in Figures 1 and 2.

This invention has as its prime purpose the provision of a method of accelerating an internal combustion engine such as an automobile engine so that said engine will function smoothly and properly throughout the range of acceleration regardless of the load imposed thereon. It is common knowledge that an internal combustion engine such as that used in automobiles is often stopped or "killed" because the operator overloads said engine at low speeds by engaging the clutch and failing to accelerate said engine properly.

Further, in the modern automobile which uses a fluid coupling, centrifugal clutch or other automatic or semi-automatic drive mechanisms, it is desirable that the initial rate of acceleration be more rapid than was generally provided in older cars which did not have such automatic drive mechanisms. This faster rate of acceleration is desirable to quicken the engagement of said drive mechanisms and reduce the period of slippage therein. Applicant's invention provides a mechanism wherein the throttle of the carburetor is opened rapidly when the operator first depresses the accelerator pedal, thus increasing the speed of the engine so that it may handle loads imposed thereon.

Illustrated in Figure 1 is a portion of an automobile having an engine 2 and a front body panel or dash 4. The engine 2 has associated therewith a clutch housing 6 and transmission case 8. Engine 2 is also provided with a carburetor 10 which has the usual throttle valve 11 (Figure 2) operated by rotation of a control arm 32 (Figure 3). The dash panel 4 forms a part of the toe board 14 and the floor panel 16. Mounted on the toe board 14 is an accelerator pedal 18 which is pivoted at 20 and provided with an arm 22 which passes through the toe board and extends forwardly into the motor compartment.

Near the top of the dash panel 4 on the left side of the motor 2 a first pulley 24 is secured by a bracket 26 which is rigidly secured to the dash panel 4. A second pulley 28 is secured to dash panel 4 on the right side of motor 2 by bracket 30.

To throttle rod 12 is rigidly secured the control arm 32 which extends upwardly therefrom. Rigidly secured to arm 32 is an arcuate ramp 34 which is flanged on its outer side. The flange of the ramp 34 is cut off at 36 (Figure 3) and the ramp is bent upwardly at its lower forward end to form a stop 38 (Figure 3). The stop 38 is apertured at 40. The ramp 34 is apertured near its upper backward end at 42.

A flat plate 44 (Figure 2) is secured to the top of the engine 2 by the head bolt 46 of said engine in a position forward of the carburetor 10. Plate 44 is apertured near its outer end as at 48.

A first tension spring 50 is provided, having its one end hooked through aperture 48 and its other end hooked in aperture 42 of ramp 34. In this arrangement, tension spring 50 tends to rotate ramp 34, arm 32, and rod 12 in a clockwise direction, when looking at the right side of the engine, which closes valve 11.

A flexible cable 52 is secured to the forward end 54 of accelerator arm 22 and passes upwardly therefrom over pulley 24, pulley 28 and ramp 34, from which it extends downwardly through aperture 40 in stop 38 of ramp 34 and has a stop 54 secured near its end and below stop 38.

A second tension spring 56 is positioned around a portion of cable 52 and has its one end 58 hooked through aperture 60 of ramp 34. Spring 56 extends upwardly from aperture 60 over ramp 34 to a clamp 62 rigidly secured to cable 52, which has an aperture 64 therein in which the other end of tension spring 56 is hooked.

To the end of arm 32 which is remote from throttle rod 12 is rotatably secured a rigid rod 66. Rod 66 extends backwardly from arm 32 and has a socket member 68 rigidly secured to its rearward end. Socket 68 engages ball member 70 which has a portion 72 threaded into aperture 74 formed in pulley 28. It will be noted that ball member 70 is positioned remote from the center of pulley 28. Pulley 28 is rigidly secured to shaft 76 which is rotatably carried by bracket 30. Clamp means 78 are provided on pulley 28 to rigidly secure cable 52 thereto so that any movement of said cable will rotate pulley 28.

When the operator of the vehicle depresses foot pedal 18, the inner end 54 of arm 22 will be moved downwardly, pulling cable 52, which will rotate pulley 28 in a clockwise direction. At normal position, the ball member 70 is positioned between the axis of pulley 28 and the arm 32. Thus rotation of pulley 28 in a clockwise direction will move ball member 70 away from arm 32 as it is eccentric in regard to the axis of pulley 28, which will pull rod 66 and rotate arm 32 in a clockwise direction as viewed in Figure 3, which will rotate rod 12 in a like direction, opening the throttle valve 11 of the carburetor 10.

In this manner, the invention provides for immediate acceleration of the engine 2 by this direct connection between pedal 18 and carburetor 10 when the operator depresses the pedal 18. However, it will be noted that the valve 11 of carburetor 10 will only be opened a predetermined amount which is controlled by the distance ball member 70 is positioned from the axis of pulley 28. The outer end of arm 32 will only be rotated twice the distance that ball member 70 is positioned from the axis of pulley 28 as that is the maximum distance rod 66 will be pulled by ball 70. This will be accomplished by a 180° rotation of pulley 28. In this manner, the invention provides for quick acceleration of the engine so that it will not be killed by rapid engagement of the clutch, which is a frequent occurrence when operating an automobile with a manually controlled clutch, and this rapid acceleration will also quickly put the elements of an automatic driving unit in operation to reduce the lapse of time between the initial depression of the accelerator pedal and the operation of the automatic unit.

It is commonly known that following the initial steps in starting the automobile as just described above, a slow rate of acceleration is desirable to produce a smooth flow of power in reaching the desired cruising speed. This is provided by the tension spring 56 which is secured to the cable 52 by the member 62.

Spring 56 will stretch when it is initially pulled by cable 52 and in this way slowly rotate ramp 34 in a clockwise direction as shown in Figure 3 which will rotate arm 32 and rod 12 in a like direction, thus opening the throttle member of carburetor 10. Spring 56 stretches when pulled by cable 52 due to the power exerted by the lighter spring 50, which tends to rotate ramp 34 in the opposite direction. When spring 56 is stretched in this manner to a predetermined length, stop member 54 secured to cable 52 will be pulled up into abutment with stop 38 of ramp 34 and thus ramp 34, arm 32, and rod 12 will again be rotated directly by the cable 52 as it will be pulling against the stop 38 of ramp 34 through its stop member 54. Thus after the initial and intermediate steps of acceleration as just described, the operator is provided with a rigid connection through cable 52 with the valve 11.

As arm 32 is rotated in a clockwise direction (Figure 3) in this manner, its outer end 78 will approach a position which is at a distance from ball 70 which is less than the length of rod 66. Therefore, the connection means provided between the rod 66 and the end 78 of arm 32 is a one-way connection comprised of a member 80 which is rotatably secured in the end 78 of arm 32 and is provided with an aperture 81 through which extends rod 66. On its forward end, rod 66 is provided with an enlarged portion 82 which is larger than the aperture 81 in member 80, thus preventing rod 66 from being pulled out of member 80. However, rod 66 is loosely positioned in the aperture of member 80, thus member 80 is freely slideable on rod 66 permitting arm 32 to be rotated in a clockwise direction further than provided by rod 66.

In this manner we have provided a control device for the throttle of an internal combustion engine which initially opens the throttle comparatively fast, intermediately opens the throttle gradually, and finally again provides more direct control of the throttle.

While we have described our invention in some detail, we intend this description to be an example only and not limiting on our invention to which we make the following claims:

1. A throttle control mechanism for an internal combustion engine comprising a pedal lever, a one-way direct connection and a resilient connection between said lever and said throttle for opening same, and means for closing said throttle.

2. A throttle control mechanism for an internal combustion engine comprising a pedal lever, a one-way direct connection between said lever and said throttle for opening said throttle, a partially resilient connection between said pedal and said throttle for opening said throttle, and means for closing said throttle.

3. A throttle control mechanism for an internal combustion engine having a manually controlled pedal lever, connection means between said lever and said throttle comprising a one-way connection for initially opening said throttle, a resilient connection for intermediately opening said throttle, a second direct connection, and means for closing said throttle.

4. A throttle control mechanism for an internal combustion engine comprising a pedal lever, a one-way direct connection between said lever and said throttle for initially opening said throttle, a resilient connection for opening said throttle beyond said initial opening, a second one-way direct connection for opening said throttle beyond the intermediate opening thereof, and means for closing said throttle.

5. A throttle control mechanism for the throttle of an internal combustion engine comprising a pedal lever, a throttle valve in said throttle, a rotatable arm secured to said valve for opening and closing same, a one-way direct connection between said lever and said arm for rotating said arm to open said valve, a resilient one-way connection for rotating said arm to open said valve, a second one-way direct connection for opening said valve beyond a predetermined stage, and means for rotating said arm to close said valve.

6. A throttle control mechanism for an internal combustion engine comprising a pedal lever, a throttle valve, a rotatable arm secured to said throttle valve for opening and closing same, a rotatable pulley, a cable secured near its one end to said lever and passing over and securing to said pulley and having its other end resiliently secured to said arm for rotating same to open said valve, a rigid link extending between said arm and said pulley having its one end secured eccentrically on said pulley and having its opposite end secured to said arm by a one-way direct connection for rotating said arm in one direction to open said valve, and means for rotating said arm in one direction to close said valve.

7. A throttle control mechanism for an internal combustion engine comprising a throttle valve, a rotatable arm secured to said valve for opening and closing same, a ramp rigidly secured to said arm, a rotatable pulley, a flexible cable having its one end secured to said pedal lever and an intermediate portion passing over said pulley and secured thereto and near its other end passing over said ramp and resiliently secured thereto for rotating said arm in one direction to open said throttle valve, an aperture in said ramp through which said cable extends to its end, a stop means secured adjacent said end of the cable and designed to be drawn into abutment with said ramp adjacent said aperture when said resilient connection is extended, a rigid link extending between said pulley and said arm, connection means securing one end of said link eccentrically to said pulley, a one-way connection between the opposite end of said link and said arm for rotating said arm in one direction to open said throttle valve, and means for rotating said arm to close said throttle valve.

8. A throttle control mechanism for an internal combustion engine comprising a throttle having a throttle valve, a rotatable arm secured to said valve for opening and closing same, a ramp rigidly secured to said arm, a pedal lever, a pulley intermediate said pedal lever and said throttle, a flexible cable secured near its one end to said pedal lever and passing over and rigidly secured to said pulley for rotating said pulley when said pedal lever is depressed, a rigid link extending between said pulley and said arm, an eccentric connection between said pulley and one end of said link for pulling said link when said pulley is initially rotated, a one-way direct connection between the opposite end of said link and said arm, a resilient connection between said cable and said ramp for rotating said arm to open the throttle valve, a lost motion connection between said cable and said ramp for rotating said arm to open said throttle valve, and means for rotating said arm to close said valve.

9. A throttle control mechanism for an internal combustion engine comprising a throttle valve, a control arm for opening and closing said valve, a pedal lever, a pulley intermediate said pedal lever and said control arm, a link extending between said pulley and said control arm, a one-way direct connection between one end of said link and said control arm, a rotatable connection between the other end of said link and said pulley and eccentric in regard to said pulley, a cable rigidly secured near its one end to said pedal lever and passing over and rigidly secured to said pulley for rotating same to pull said link through said rotatable connection upon initial rotation of said pulley for rotating said arm, a ramp rigidly secured to said control arm, a resilient connection between said cable and said ramp for rotating said control arm beyond the initial rotation thereof by said link, a lost motion connection between said cable and said ramp for rotating said control arm beyond the rotation thereof by said resilient connection, and means for rotating said control arm for closing said valve.

10. A throttle controlled mechanism for an internal combustion engine comprising a throttle, a pedal lever, connection means extending between said pedal lever and throttle for operating said throttle comprising a one-way direct connection therebetween for opening said throttle, a partially resilient one-way connection for opening said throttle, and means for closing said throttle.

11. A throttle controlled mechanism for an internal combustion engine comprising a throttle valve, a pedal lever, a rotatable pulley, means drivingly connecting said pedal and said pulley and extending to said valve, resilient means connecting said means to said valve, a rigid link drivingly secured eccentrically on said pulley and extending to said valve, a one-way connection securing said rigid link to said valve for opening same, and means for closing said valve.

12. A throttle controlled mechanism for an internal combustion engine comprising a throttle valve, a control means for opening and closing said valve, a manually controlled means, a rotatable pulley, a connecting means rigidly secured to said manual means and drivingly secured on said pulley and extending to the control means for the valve, a resilient connection between said connecting means and the control means for the valve, a link secured eccentrically on said pulley and extending to the control means for the valve, a one-way connection securing said link to the control means for the valve for opening said valve, and means for closing said valve.

NILS ERIK WAHLBERG.
JOSEPH F. SLADKY.

REFERENCES CITED

The following references are of record in the file of this patent:

UNITED STATES PATENTS

| Number | Name | Date |
| --- | --- | --- |
| 1,029,685 | Huff | June 18, 1912 |
| 1,097,778 | Tibbetts | May 26, 1914 |
| 1,459,317 | Birdsall | June 19, 1923 |
| 1,514,860 | Pearce | Nov. 11, 1924 |
| 1,530,894 | Hayes | Mar. 24, 1925 |
| 1,810,128 | Chapel | June 16, 1931 |
| 2,067,332 | Numer | Jan. 12, 1937 |

Certificate of Correction

Patent No. 2,504,286                                April 18, 1950

NILS ERIK WAHLBERG ET AL.

It is hereby certified that error appears in the printed specification of the above numbered patent requiring correction as follows:

Column 4, line 54, before the word "connection" insert *direct*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*